United States Patent
Higashida

(10) Patent No.: US 6,931,476 B2
(45) Date of Patent: Aug. 16, 2005

(54) ELECTRONIC APPARATUS WITH ROM DATA CORRECTION FUNCTION

(75) Inventor: Motoki Higashida, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 290 days.

(21) Appl. No.: 10/330,123

(22) Filed: Dec. 30, 2002

(65) Prior Publication Data

US 2004/0015639 A1 Jan. 22, 2004

(30) Foreign Application Priority Data

Jul. 19, 2002 (JP) .................................... 2002-211470

(51) Int. Cl.[7] .............................................. G06F 12/00
(52) U.S. Cl. ............................. 711/2; 711/102; 714/53
(58) Field of Search .............................. 714/751–754, 714/758–768, 39, 49, 53; 711/1–2, 5, 8; 712/227, 234; 438/587

(56) References Cited

U.S. PATENT DOCUMENTS

| | | | | |
|---|---|---|---|---|
| 5,206,866 A | * | 4/1993 | Tanagawa | 714/763 |
| 5,262,342 A | * | 11/1993 | Toyama et al. | 438/587 |
| 5,784,537 A | * | 7/1998 | Suzuki et al. | 714/5 |
| 6,829,735 B1 | * | 12/2004 | Aoyama | 714/53 |
| 2003/0097618 A1 | * | 5/2003 | Kim et al. | 714/39 |

FOREIGN PATENT DOCUMENTS

JP 4-346127 12/1992

* cited by examiner

Primary Examiner—Nasser Moazzami
(74) Attorney, Agent, or Firm—Burns, Doane, Swecker & Mathis LLP

(57) ABSTRACT

An electronic apparatus has in a CPU core an instruction correcting circuit that includes memory cells, a comparator and a selector. The memory cells store, when initializing the electronic apparatus, a correction address, a correction instruction and a correction enabling bit, which are associated with contents of a read-only memory. The comparator compares an instruction address output from an instruction prefetch stage of the CPU core with the correction address stored in the memory cells. The selector selects either an instruction code read from the instruction address of the read-only memory or the correction instruction stored in the memory cells in response to a compared result of the comparator. The electronic apparatus can correct the ROM data after manufacturing without reducing the number of available interrupts or the operation speed of the CPU.

6 Claims, 13 Drawing Sheets

ELECTRONIC APPARATUS WITH ROM DATA CORRECTION FUNCTION

BACKGROUND OF THE INVENTION

1. Field of the Invention

The present invention relates to a circuit that provides software programs in the form of a masked ROM, and more particularly to an electronic apparatus capable of correcting part of program and data contents in the masked ROM.

2. Description of Related Art

It is essential for an electronic apparatus that carries out software control using a CPU (Central processing Unit) to have a read-only memory for storing software programs. As the read-only memory for mass-produced electronic apparatuses, masked ROMs (Read Only Memories) are often used to reduce their cost. If a software failure is detected in the masked ROM after manufacturing, it is necessary to reproduce the masked ROM. To avoid the reproduction, a method is conceived that corrects part of the data of the masked ROM when using it.

For example, Japanese patent application laid-open No. 4-346127/1992, "Electronic apparatus", discloses a method of rewriting data of a masked ROM. The conventional method discloses the following two types of rewriting.

(1) When accessing an address to be rewritten, the data output from the masked ROM to the data bus is stopped, and the data to be corrected is placed on the data bus.

(2) When accessing an address to be rewritten, an interrupt is caused. An interrupt handler is placed on a RAM (Random Access Memory), so that it circumvents the faulty software.

To improve the processing speed, recent CPUs often employ a pipeline CPU core that processes data in an assembly-line like method by increasing the operation clock frequency and by passing the data through a plurality of stages with a smaller number of clock pulses.

FIG. 14 is a block diagram showing a configuration of a ROM correcting circuit using a conventional pipeline CPU core, which shows an electronic apparatus that combines the foregoing method (1) disclosed by Japanese patent application laid-open No. 4-346127 with a pipeline CPU core. In FIG. 14, the reference numeral 10 designates an electronic apparatus consisting of an LSI, and 20 designates a rewritable device storing correction data. The reference numeral 100 designates a pipeline CPU core, 200 designates an external I/O device, 300 designates an SRAM (Static Random Access Memory), 400 designates a masked ROM, 500 designates a ROM data correcting circuit, 11 designates a data bus, and 12 designates an address bus.

In the pipeline CPU core 100, the reference numeral 110 designates an instruction prefetch section including an instruction buffer 111, 120 designates a instruction decoding section, and 130 designates a data processing section. The reference numeral 140 designates a memory access section including a data buffer 141, 150 designates a register write-back section, and 160 designates a memory bus IF (interface). In the ROM data correcting circuit 500, the reference numeral 510 designates a selector (SEL), 520 designates a correction address section, and 530 designates a correction data section.

The pipeline CPU core 100 has five pipeline stages consisting of the instruction prefetch section 110, instruction decoding section 120, data processing section 130, memory access section 140 and register write-back section 150. The pipeline CPU core 100 processes each instruction by dividing it into subdivisions corresponding to the pipeline stages. A non-pipeline CPU core executes the entire processing with a single large combination circuit. Accordingly, it is difficult for the non-pipeline CPU core to increase its operation frequency. In contrast, the present pipeline CPU core 100 can reduce the processing amounts of the individual pipeline stages, and increase its operation frequency with ease. However, as for the electronic apparatuses using the pipeline CPU core, a bottleneck arises in increasing the operation frequency in the sections other than the CPU core. It is generally a path from the output of the masked ROM 400 to the memory bus IF 160 through the data bus 11 of FIG. 14.

With the foregoing configuration, the conventional masked ROM correcting circuit includes the selector 510 of the ROM data correcting circuit 500, which is interposed in the path from the data output of the masked ROM 400 to the memory bus IF 160 as show in FIG. 14. This causes a bottleneck in increasing the operation frequency. Consequently, the method (1) presents a problem of reducing the operation speed of the CPU. In addition, the pipeline CPU core 100 limits the number of available interrupts to reduce the load of the data processing stages. Accordingly, the method (2) has a problem of lacking the number of available interrupts.

SUMMARY OF THE INVENTION

The present invention is implemented to solve the foregoing problems. It is therefore an object of the present invention to provide an electronic apparatus capable of correcting ROM data after manufacturing its masked ROM data, and correcting the ROM data without reducing the number of available interrupts and the operation speed of the CPU.

According to a first aspect of the present invention, there is provided an electronic apparatus including a CPU core for carrying out pipeline processing according to data read from a read-only memory, the CPU core including an instruction correcting circuit comprising: at least one set of memory cells for storing, when initializing the electronic apparatus, a correction address, a correction instruction and a correction enabling bit, which are associated with contents of the read-only memory; at least one comparator for comparing an instruction address output from an instruction prefetch stage of the CPU core with the correction address stored in the memory cells; and a selector for selecting one of the instruction code read from the instruction address of the read-only memory and the correction instruction stored in the memory cells in response to a compared result of the comparator. It offers an advantage of being able to correct the ROM data without reducing the operation speed of the CPU core, and without inserting new hardware into the path from the read-only memory to the instruction buffer in the CPU core.

According to a second aspect of the present invention, there is provided an electronic apparatus including a CPU core for carrying out pipeline processing according to data read from a read-only memory, the CPU core including a data correcting circuit comprising: at least one set of memory cells for storing, when initializing the electronic apparatus, a correction address, a correction address, correction data and a correction enabling bit, which are associated with contents of the read-only memory; at least one comparator for comparing a data address output from a data processing stage of the CPU core with the correction address stored in the memory cells; and a selector for selecting one of the data read from the data address of the read-only memory and the correction data stored in the memory cells in response to a compared result of the comparator. It offers an advantage of being able to correct the ROM data without reducing the operation speed of the CPU core, and without inserting new hardware into the path from the output of the read-only memory to the memory bus interface.

DETAILED DESCRIPTION OF THE PREFERRED EMBODIMENTS

The invention will now be described with reference to the accompanying drawings.
Embodiment 1

Figure 1:
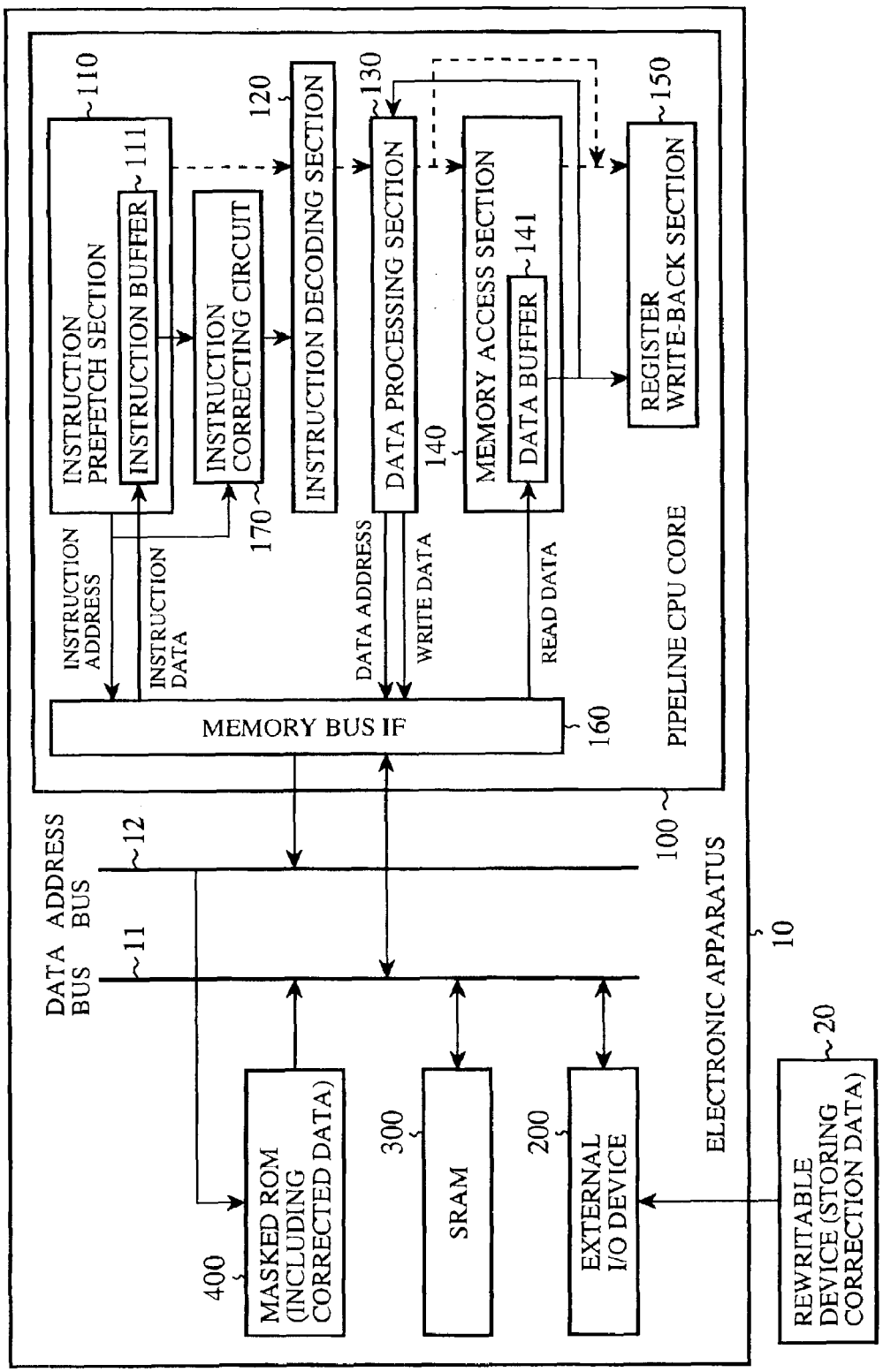
FIG. 1 is a block diagram showing a configuration of an embodiment 1 of the electronic apparatus in accordance with the present invention.

FIG. 1 is a block diagram showing a configuration of an embodiment 1 of the electronic apparatus in accordance with the present invention.

Figure 2:
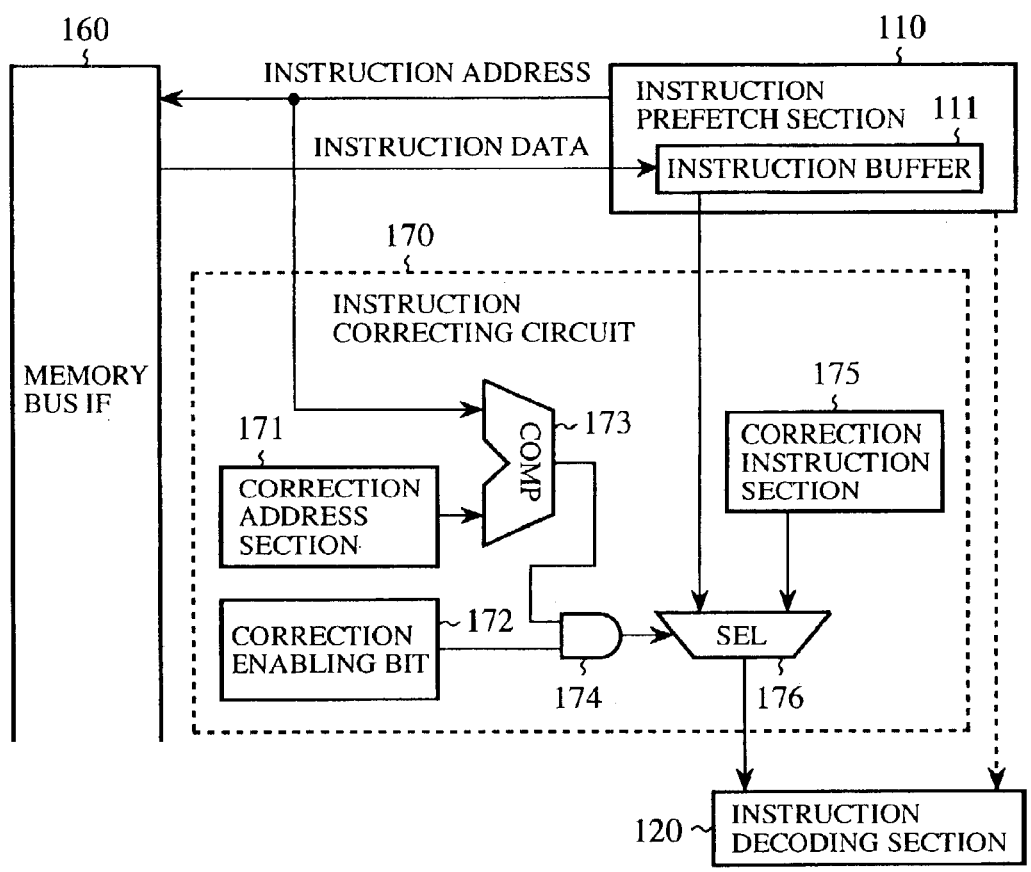
FIG. 2 is a block diagram showing an internal configuration of the instruction correcting circuit of the embodiment 1.
Figure 14:
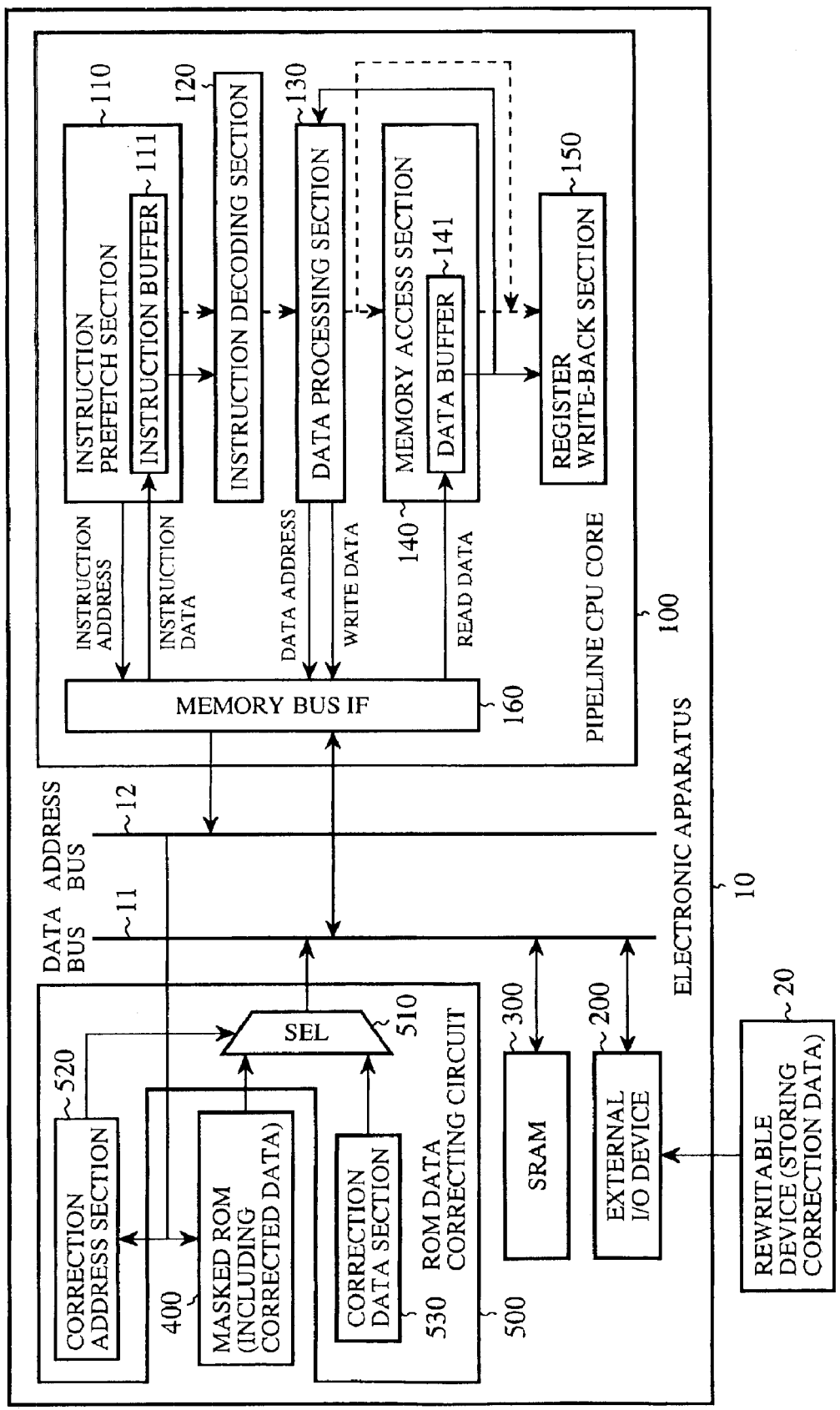
FIG. 14 is a block diagram showing a configuration of a conventional correcting circuit.

In FIG. 1, the same or like portions to those of the conventional electronic apparatus as shown in FIG. 14 are designated by the same reference numerals. The present embodiment 1 differs from the configuration of FIG. 14 in the following. First, it lacks the ROM data correcting circuit 500 adjacent to the masked ROM (read-only memory) 400. Second, it includes an instruction correcting circuit 170 interposed between the instruction prefetch section 110 and instruction decoding section 120 in the pipeline CPU core 100. In other words, the pipeline CPU core 100 includes the instruction correction function as its integral part. FIG. 2 shows a detailed configuration of the instruction correcting circuit 170. In FIG. 2, the reference numeral 171 designates a correction address section, 172 designates a correction enabling bit, 173 designates a comparator (COMP), 174 designates an AND gate, 175 designates a correction instruction section, and 176 designates a selector (SEL).

The correction address section 171, correction instruction section 175 and correction enabling bit 172 are implemented as CPU rewritable memory cells. The correction address section 171 stores an address of the masked ROM 400 to be corrected. The correction instruction section 175 stores the corrected instruction data. The correction enabling bit 172 is placed at "1" when the correction is necessary, and "0" when it is unnecessary. The comparator 173 compares the instruction address output from the instruction prefetch section 110 with a value of the correction address section 171. The selector 176 selects the data in the correction instruction section 175 if the "compared result indicates the two addresses are identical" and "correction enabling bit is "1"". On the other hand, it selects the data in the data instruction buffer 111 if the "compared result indicates the two addresses are not identical" or the "correction enabling bit is "0"". It supplies the selected data to the instruction decoding section 120. Thus, when the instruction address is identical with the value in the correction address section 171, the circuit of FIG. 2 enables the instruction data in the correction instruction section 175 to be executed instead of the instruction data read into the instruction buffer 111 from the masked ROM 400 through a signal line of the instruction data.

Figure 3:
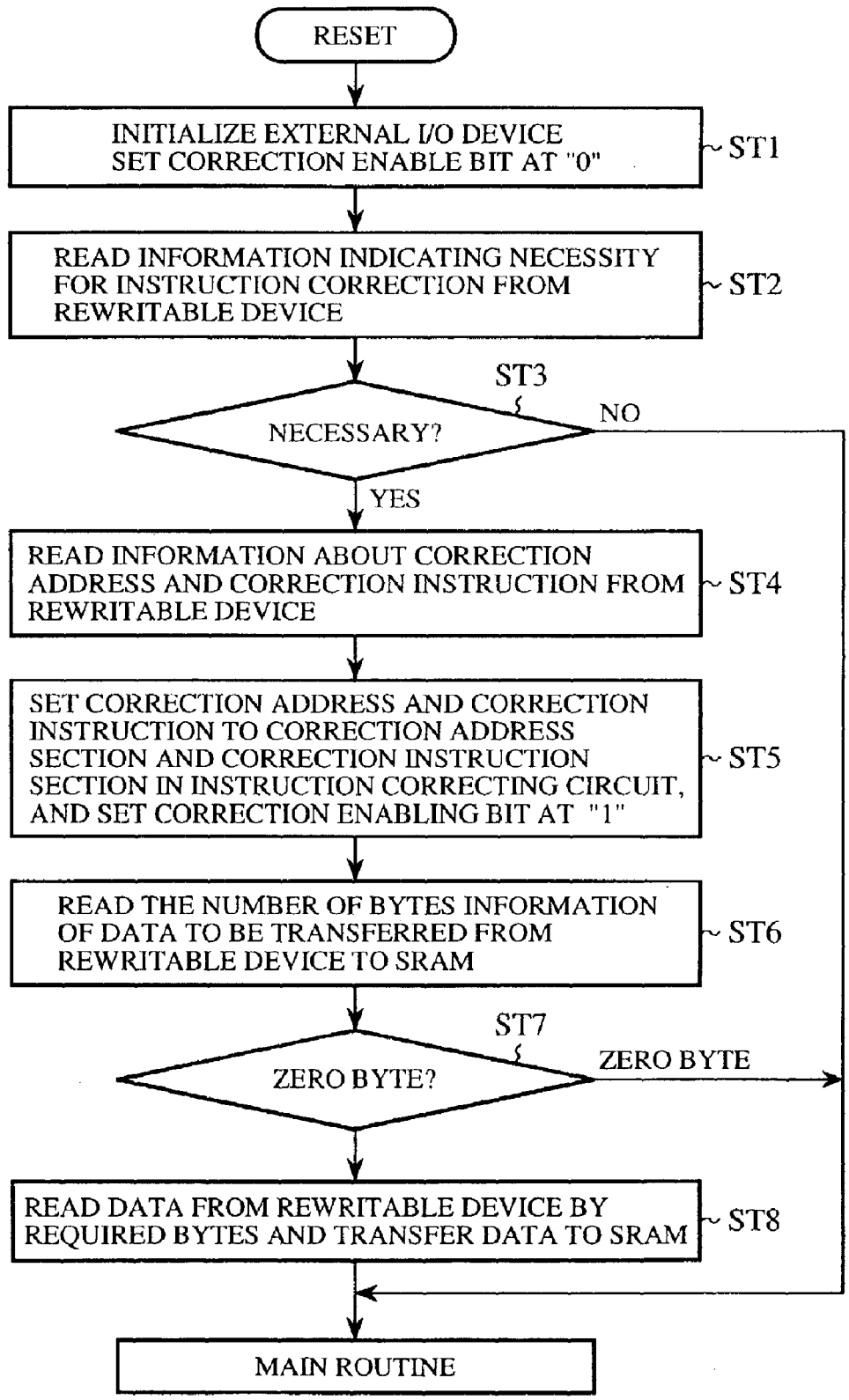
FIG. 3 is a flowchart illustrating a procedure of a software program for carrying out the correction of the masked ROM of the embodiment 1.

FIG. 3 is a flowchart illustrating a procedure of a software program for executing the correction of the masked ROM 400.

First, the program initializes the external I/O device 200, thereby enabling the access to the rewritable device 20 connected to the external I/O device. Then, the program sets the correction enabling bit in the instruction correcting circuit at "0" (step ST1). It accesses the rewritable device 20 to obtain information about the necessity for the instruction correction (step ST2). When the instruction correction is not necessary, the processing jumps from step ST3 to the main routine. On the other hand, when the instruction correction is necessary, it reads the information about the correction address and correction instruction from the rewritable device 20 (step ST4) The program writes the information read at step ST4 into the memory cells of the correction address section 171 and correction instruction section 175 in the instruction correcting circuit 170, and sets the correction enabling bit 172 to "1" (step ST5). Subsequently, it reads the information about the number of bytes to be transferred from the rewritable device 20 to the SRAM 300. (step ST6). When the software in the masked ROM 400 cannot be corrected by replacing one instruction and requires additional instructions, the program handles the case by storing the additional instructions into the SRAM 300. In this case, the information indicating the number of the additional instructions is read. When the additional instructions are present, the instruction to be placed in the correction instruction section 175 is a jump instruction to the top address of the SRAM 300 storing the additional instructions. At step ST8, the program reads the data from the rewritable device 20 in accordance with the number of bytes of the additional instructions, and transfers the data to the SRAM 300.

The above is a flow of the program enabling the correction of the instruction in the masked ROM 400. The program itself is placed in the masked ROM 400 to be executed immediately after the reset of the electronic apparatus 10. Although this software portion in the masked ROM 400 is uncorrectable, it is very unlikely that it requires any correction because its size is much smaller than the main processing routine.

As described above, the present embodiment 1 of the electronic apparatus comprises between the instruction prefetch section 110 and instruction decoding section 120 in the CPU core 100 the instruction correcting circuit 170 that includes the memory cells for storing the correction address, correction instruction and correction enabling bit associated with the data stored in the masked ROM 400 at the initialization of the electronic apparatus 10; the comparator 173 for comparing the instruction address output from the instruction prefetch section 110 of the CPU core 100 with the correction address stored in the memory cells; and the selector 176 for selecting one of the instruction code read from the masked ROM 400 and the correction instruction stored in the memory cells in response to the compared result of the comparator 173. Thus, it offers an advantage of being able to correct the ROM data without reducing the operation speed of the CPU core 100, or without inserting any new hardware into the path from the external memory to the instruction buffer of the CPU core 100.

Embodiment 2

The configuration of FIG. 1 has a problem of increasing the delay of the decoder stage because of the effect of the selector 176 of the instruction correcting circuit 170. The memory bus IF 160 of FIG. 1 is sometimes configured such that it includes a data buffer for sampling the data passing through the data bus. In such a configuration, the path from the data buffer to the instruction buffer 111 is usually composed of a simple combination circuit. Thus an additional circuit into the path will not reduce the operation speed.

Figure 4:
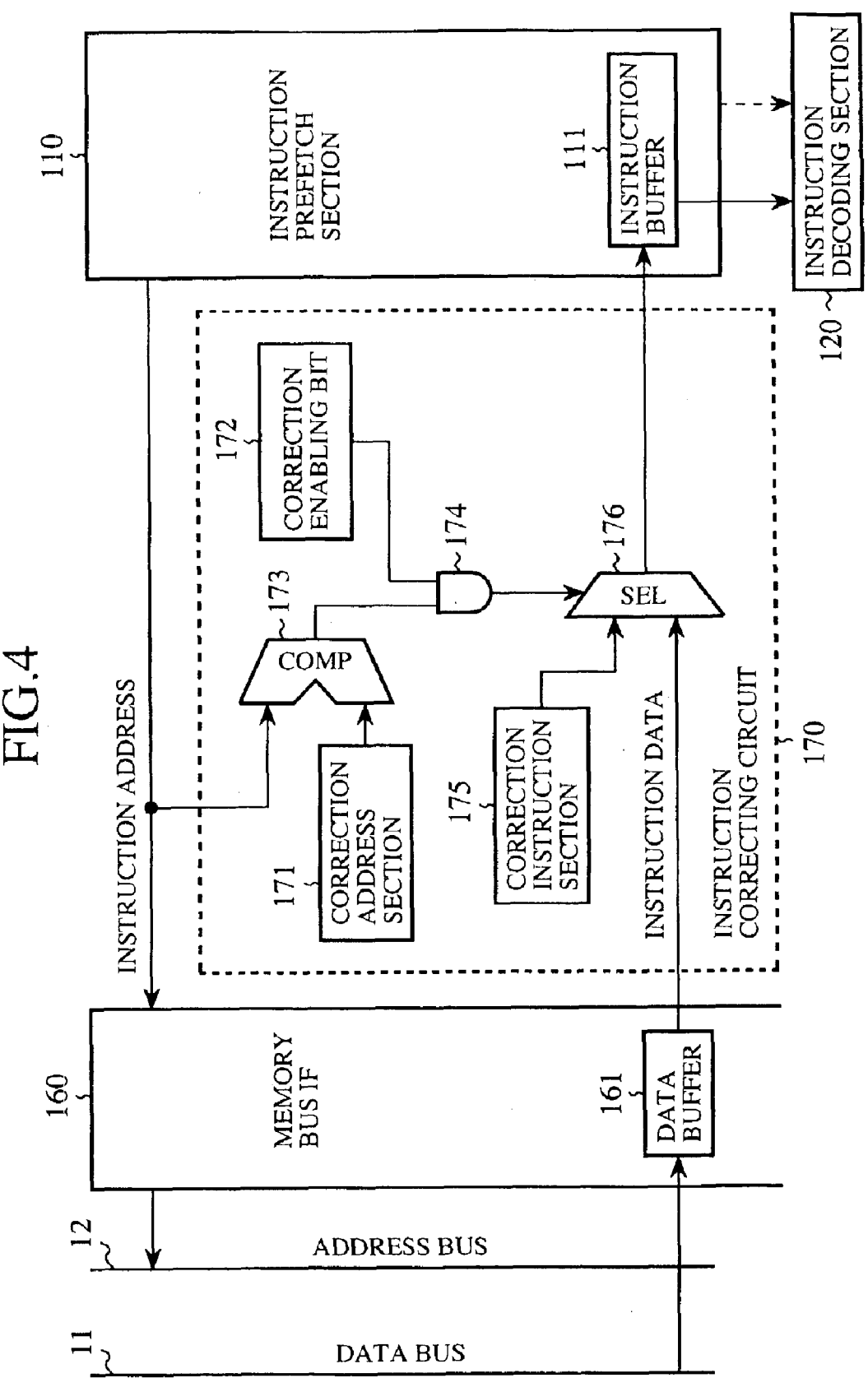
FIG. 4 is a block diagram showing a configuration of an embodiment 2 of the electronic apparatus in accordance with the present invention.

FIG. 4 is a block diagram showing a configuration of an embodiment 2 of the electronic apparatus in accordance with the present invention. The present embodiment 2 can prevent the above-mentioned problem when the memory bus IF 160 includes a data buffer 161. The instruction correcting circuit 170 is placed between the memory bus 1F 160 and the instruction prefetch section 110. The operation of the instruction correcting circuit 170 is analogous to that of the embodiment 1.

As described above, the present embodiment 2 is configured such that the instruction correcting circuit 170 is placed between the memory bus IF 160 and instruction prefetch section 110 in the CPU core 100. Thus, it offers an advantage of being able to correct the ROM data without reducing the operation speed of the CPU core 100, and without inserting any new hardware into the path from the output of the masked ROM 400 to the memory bus IF 160. In addition, it can solve the problem of increasing the delay of the instruction decoding section 120.

Embodiment 3

The configurations of the foregoing embodiments 1 and 2 enable the correction of the instruction in the masked ROM. However, as for the data in the masked ROM such as a constant used by software, since the instruction prefetch stage does not fetch such data, correction thereof is impossible by the configurations of the embodiments 1 and 2. In the present embodiment 3, a configuration enabling the correction of the data will be described.

Figure 5:
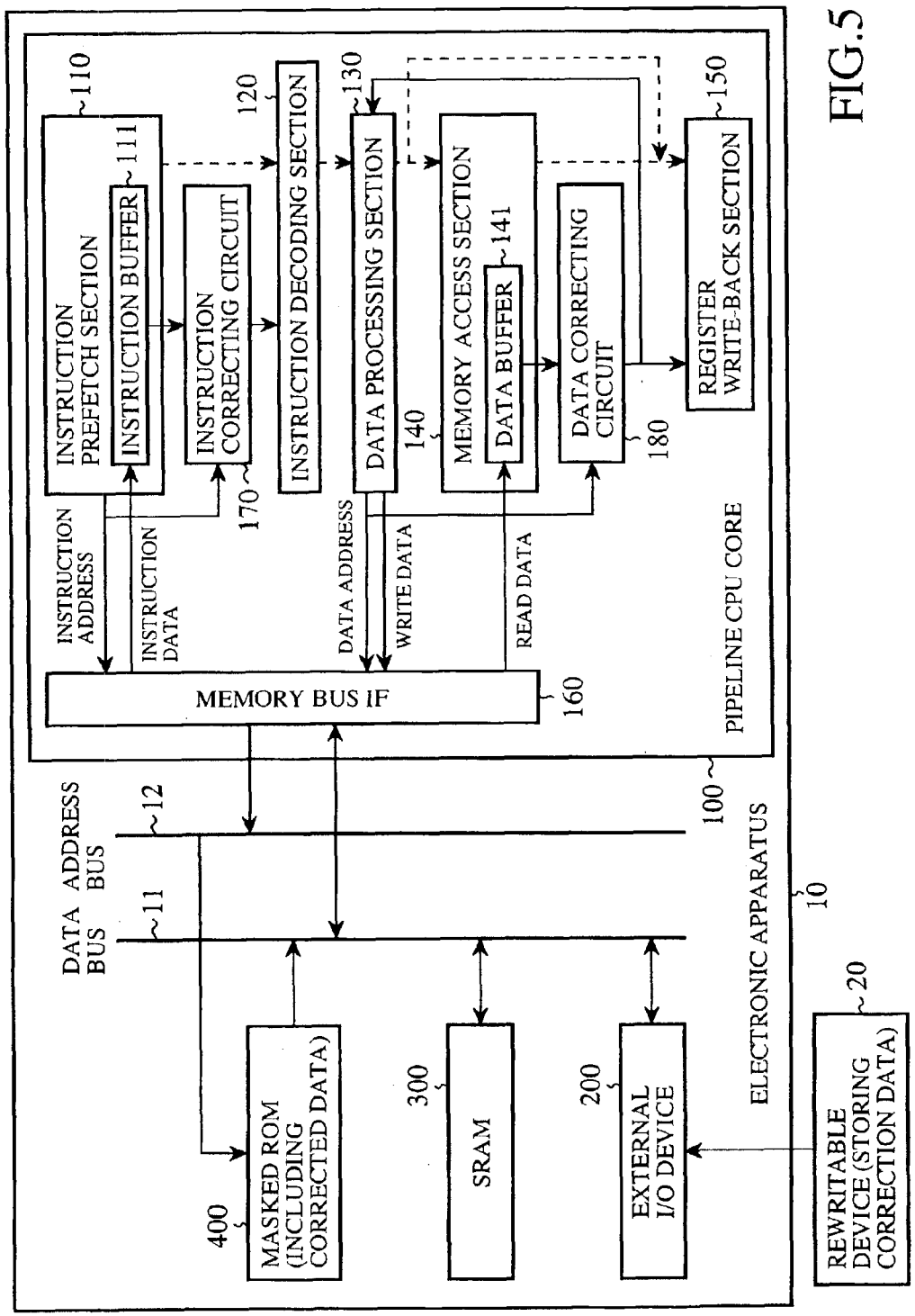
FIG. 5 is a block diagram showing a configuration of an embodiment 3 of the electronic apparatus in accordance with the present invention.
Figure 6:
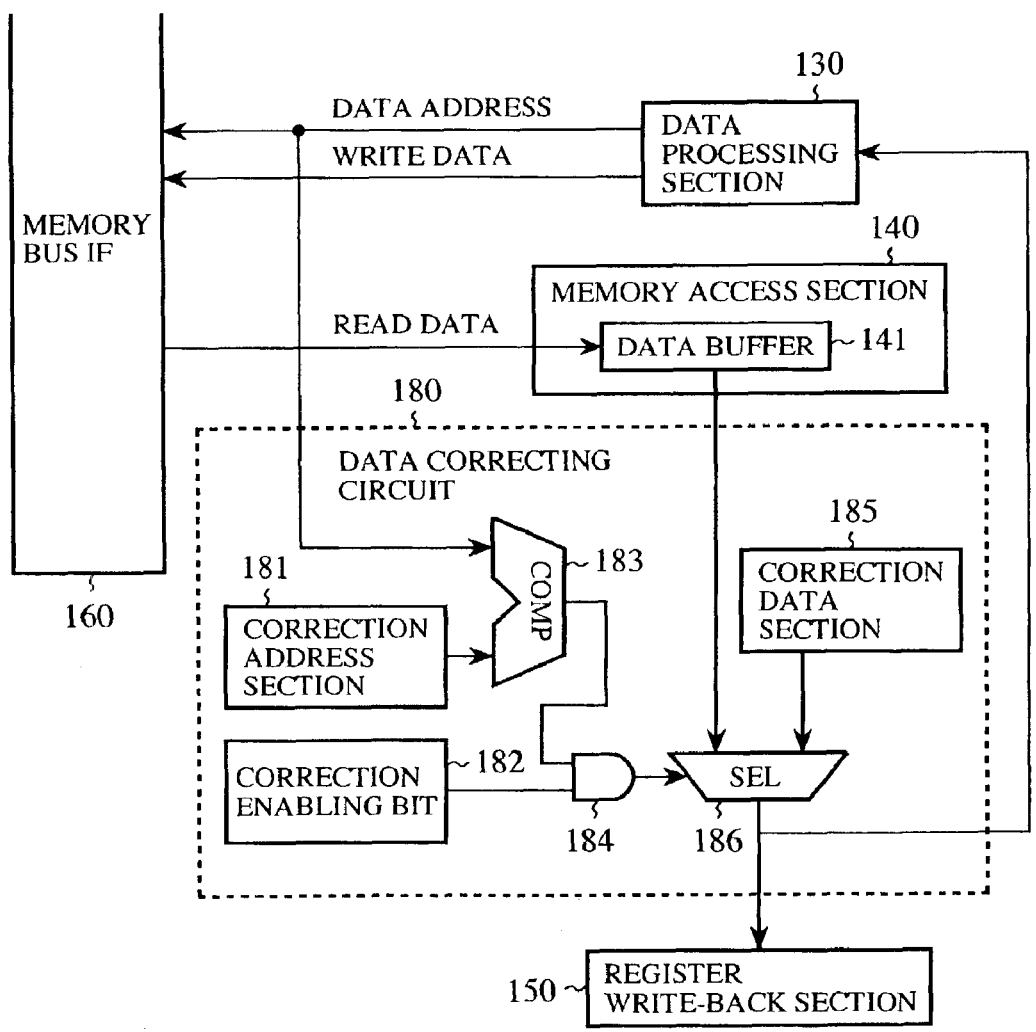
FIG. 6 is a block diagram showing a detailed configuration of the data correcting circuit of the embodiment 3.

FIG. 5 is a block diagram showing a configuration of the embodiment 3 of the electronic apparatus in accordance with the present invention. It comprises a data correcting circuit 180 next to the memory access stage, and the remaining configuration is the same as that of FIG. 1. FIG. 6 shows a detailed configuration of the data correcting circuit 180.

In FIG. 6, the correction address section 181, correction data section 185 and correction enabling bit 182 are composed of CPU rewritable memory cells. The correction address section 181 stores an address of the masked ROM 400 to be corrected. The correction data section 185 stores the corrected data. The correction enabling bit 182 is placed at "1" when the correction is necessary, and "0" when it is unnecessary. The comparator (COMP) 183 compares the data address with the correction address. The selector (SEL) 186 outputs the correction data if the "compared result indicates the two addresses are identical" and "correction enabling bit is "1"". On the other hand, it outputs the value in the data instruction buffer 111 if the "compared result indicates the two addresses are not identical" or the "correction enabling bit is "0"".

When the correction address is identical with the data address, the data correcting circuit 180 enables the correction data to be transferred to the register write-back section 150 or data processing section 130 instead of the data read from the masked ROM 400 to the data buffer 141 via the signal line of the read data.

Figure 7:
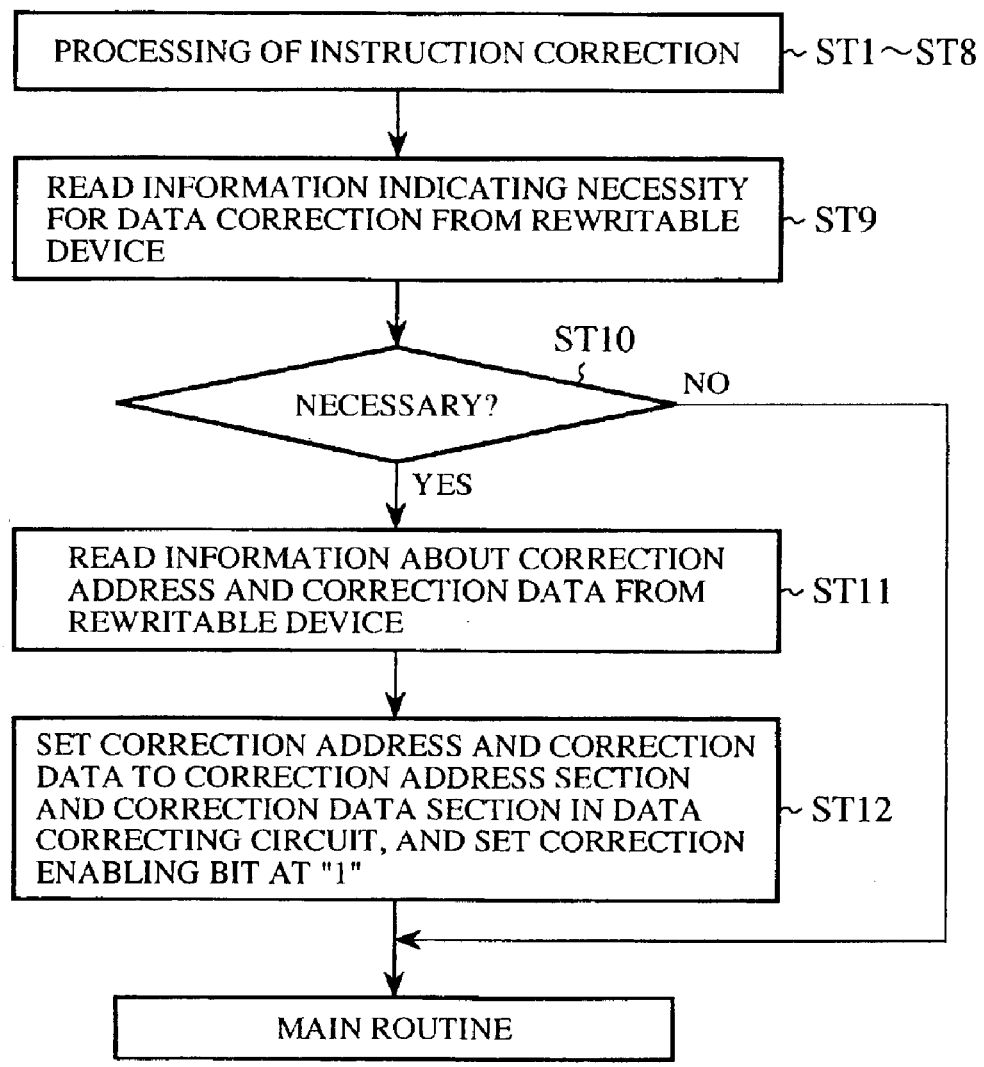
FIG. 7 is a flowchart illustrating a procedure of a software program for carrying out the correction of the masked ROM of the embodiment 3.

FIG. 7 is a flowchart illustrating a procedure of a software program for executing the correction of the masked ROM 400 data of the present embodiment 3.

Following the procedure for correcting the instruction from step ST1 to step ST8, the program reads information about the need for the data correction from the rewritable device 20 (step ST9). When the data correction is not necessary, the processing jumps to the main routine. On the contrary, if the data correction is necessary, it reads the correction address and correction data from the rewritable device 20 (step ST11) At the next step ST12, the program writes the information read at step ST11 into the memory cells of the correction address section 181 and correction data section 185 in the data correcting circuit 180, and sets the correction enabling bit 182 to "1". The additional procedure enables the data correction.

As described above, the present embodiment 3 of the electronic apparatus comprises between the memory access section 140 and register write-back section 150 in the CPU core 100 the data correcting circuit 180 that includes the memory cells for storing the correction address, correction data and correction enabling bit associated with the data stored in the masked ROM 400 at the initialization of the electronic apparatus 10; the comparator 183 for comparing the data address output from the data processing section 130 of the CPU core 100 with the correction address stored in the memory cells; and the selector 186 for selecting one of the data read from the masked ROM 400 and the correction data stored in the memory cells in response to the compared result of the comparator 183. Thus, it offers an advantage of being able to correct the ROM data without reducing the operation speed of the CPU core 100, or without inserting any new hardware into the path from the output of the masked ROM 400 to the memory bus IF 160.

Embodiment 4

As described above at the beginning of the embodiment 2, the memory bus IF 160 is sometimes configured such that it includes a data buffer for sampling the data passing through the data bus 11. In such a configuration, the additional circuit into the path from the data buffer in the memory bus IF 160 to the data buffer 141 in the memory access section 140 will not reduce the operation speed. However, the configuration of the foregoing embodiment 3 has a problem of increasing the delay of the register write-back section 150 and data processing section 130 because of the effect of the selector 186 of the data correcting circuit 180.

Figure 8:
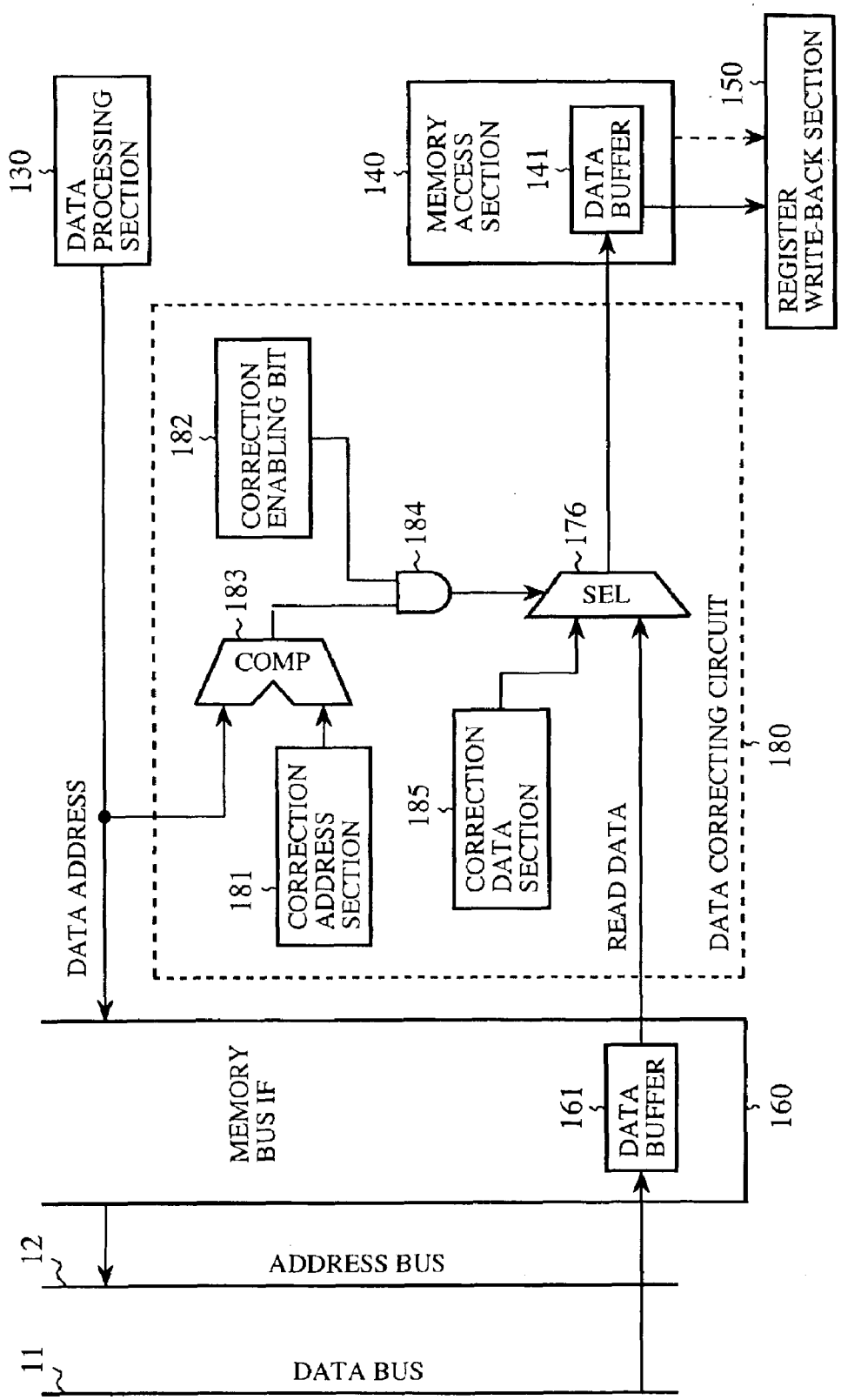
FIG. 8 is a block diagram showing a configuration of an embodiment 4 of the electronic apparatus in accordance with the present invention.

FIG. 8 is a block diagram showing a configuration of the embodiment 4 of the electronic apparatus in accordance with the present invention. The present embodiment 4 is configured considering the data buffer 161 in the memory bus IF 160. It differs from the configuration of FIG. 5 in that the data correcting circuit 180 is placed between the memory bus IF 160 and the memory access section 140. The operation of the data correcting circuit 180 is analogous to that of the embodiment 3.

As described above, the present embodiment 4 comprises the data correcting circuit 180 between the memory bus IF 160 and the memory access section 140 in the CPU core 100. Thus, it offers an advantage of being able to correct the ROM data without reducing the operation speed of the CPU core 100, or without inserting any new hardware into the path from the output of the masked ROM 400 to the memory bus IF 160. In addition, it offers an advantage of being able to solve the delay problem of the register write-back section 150 and data processing section 130.

Embodiment 5

Figure 9:
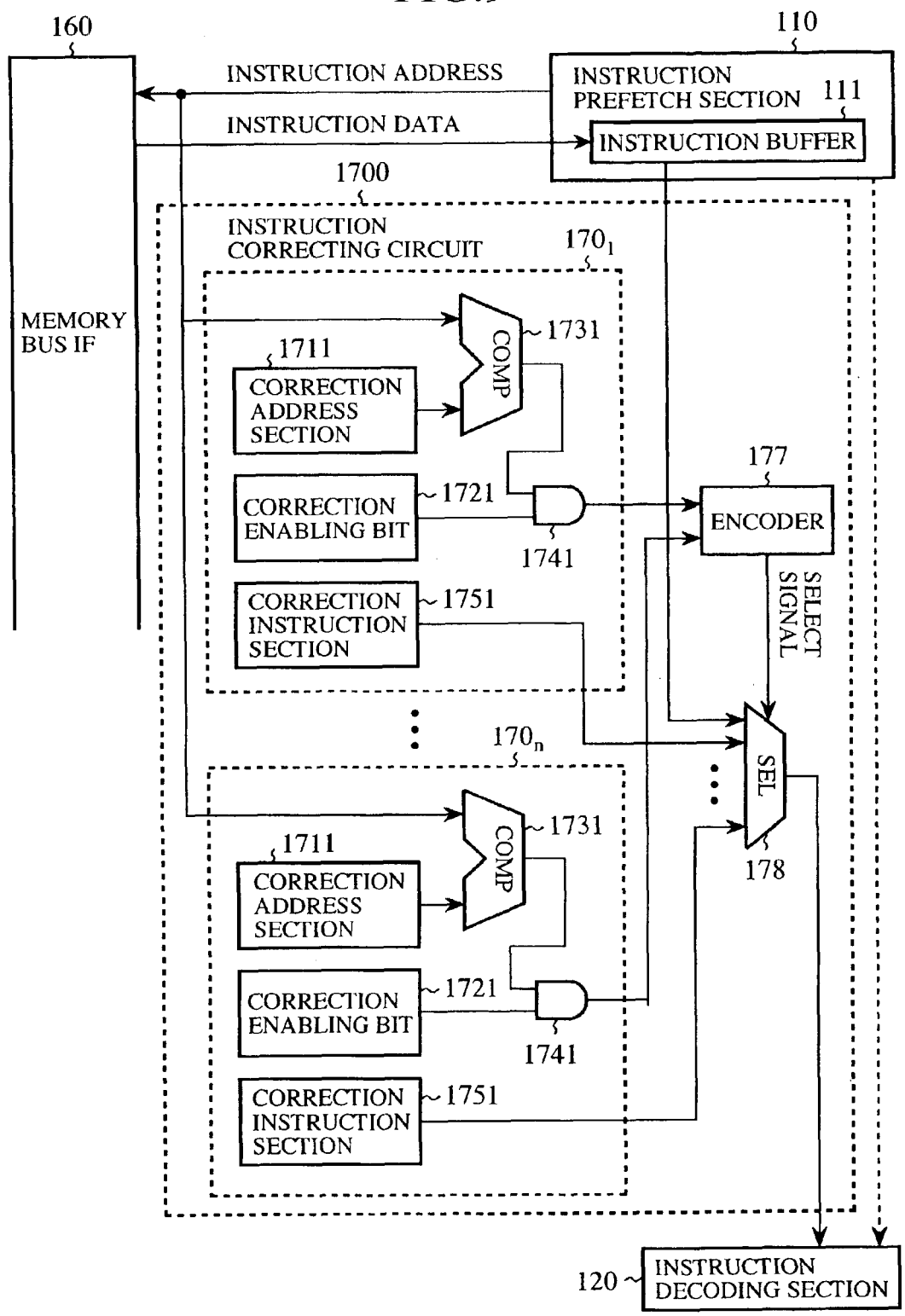
FIG. 9 is a block diagram showing a configuration of an embodiment 5 of the electronic apparatus in accordance with the present invention.

FIG. 9 is a block diagram showing a configuration of an embodiment 5 of the electronic apparatus in accordance with the present invention. It is configured such that an instruction correcting circuit 1700 is installed in place of the instruction correcting circuit 170 of FIG. 1 to correct instructions at a plurality of locations (n locations).

The instruction correcting circuit 1700 comprises the same type n blocks 170$_1$–170$_n$, each of which includes memory cells of a correction address section 1711, correction enabling bit 1721, and correction instruction section 1751; a comparator (COMP) 1731 for comparing the addresses; and an AND gate 1741. The instruction correcting circuit 1700 further comprises an encoder 177 supplied with the outputs of the individual AND gates 1741, and a selector (SEL) 178 for selecting one of the outputs of the correction instruction sections 1751 and instruction buffer 111 in response to the select signal of the encoder 177.

In the instruction correcting circuit 1700, each comparator 1731 compares the instruction address with the correction address, and supplies the compared result to the encoder 177. When the compared result of one of the blocks indicates the addresses are identical, the encoder 177 generates the select signal, and supplies it to the selector 178. Thus, the selector 178 selects the correction instruction from the corresponding correction instruction section 1751. In contrast, when none of the compared results indicates the addresses are identical, the encoder 177 generates the select signal for selecting the data of the instruction buffer 111. Thus the selector 178 transfers the selected data to the instruction decoding section 120.

As described above, besides the advantages of the foregoing embodiment 1, the present embodiment 5 has an advantage of being able to correct the instructions at a plurality of locations. The instruction correcting circuit 1700 can be installed at the position of the instruction correcting circuit 170 as shown in FIG. 4. In this case, the advantages of the embodiment 2 can also be achieved.

Embodiment 6

Figure 10:
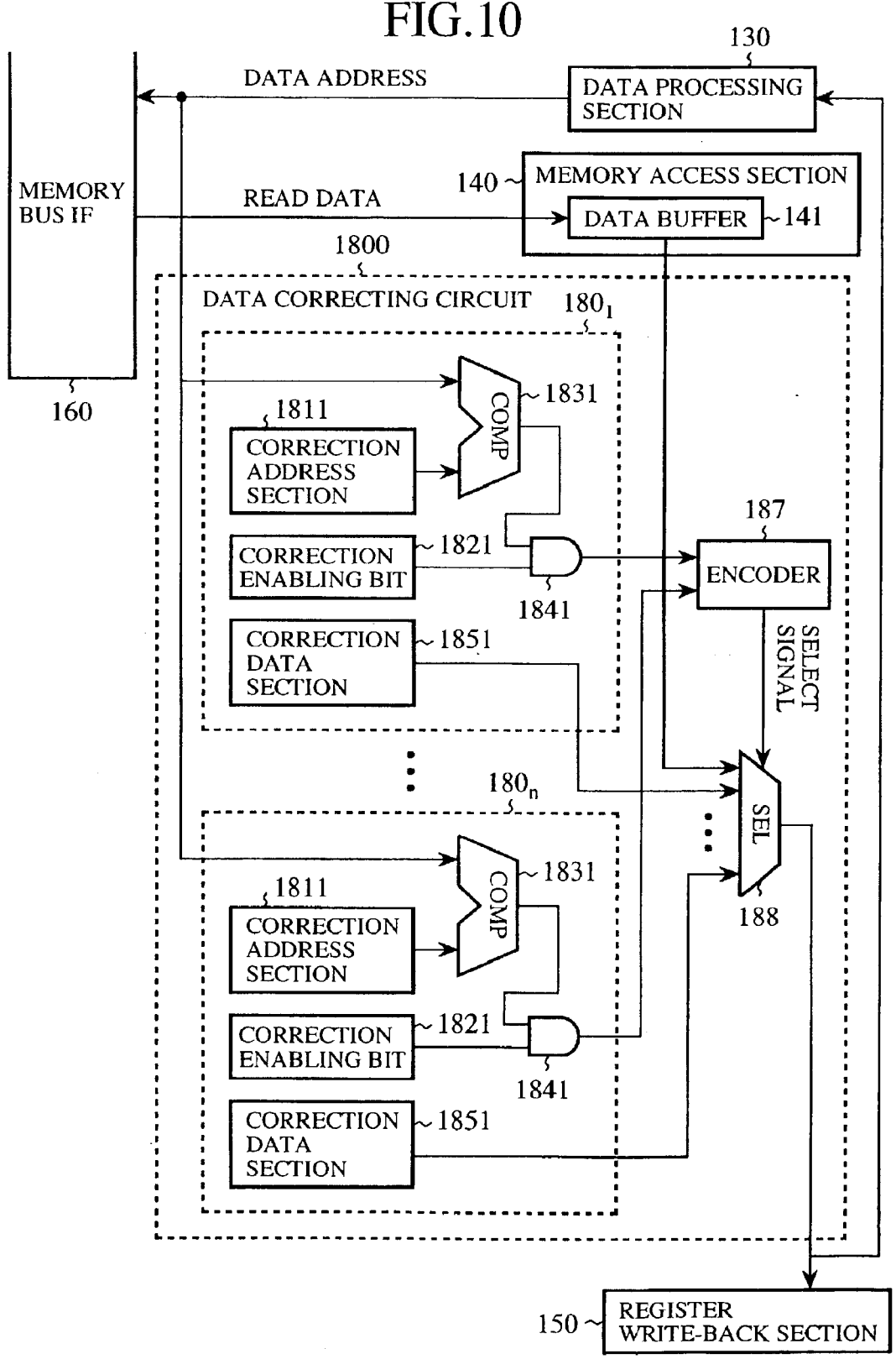
FIG. 10 is a block diagram showing a configuration of an embodiment 6 of the electronic apparatus in accordance with the present invention.

FIG. 10 is a block diagram showing a configuration of an embodiment 6 of the electronic apparatus in accordance with the present invention. It is configured such that a data correcting circuit 1800 is installed in place of the data correcting circuit 180 of FIG. 5 to correct data at a plurality of locations (n locations).

The data correcting circuit 1800 comprises the same type n blocks 180$_1$–180$_n$, each of which includes memory cells of a correction address section 1811, correction enabling bit 1821 and correction data section 1851; a comparator (COMP) 1831 for comparing the addresses; and an AND gate 1841. The data correcting circuit 1800 further comprises an encoder 187 supplied with the outputs of the individual AND gates 1841, and a selector (SEL) 188 for selecting one of the outputs of the correction data sections 1851 and data buffer 141 in response to the select signal of the encoder 187.

In the data correcting circuit 1800, each comparator 1831 compares the data address with the correction address, and supplies the compared result to the encoder 187. When the compared result of one of the blocks indicates the addresses are identical, the encoder 187 generates the select signal, and supplies it to the selector 188. Thus, the selector 188 selects the correction data from the corresponding correction data section 1851. In contrast, when none of the compared results indicates the addresses are identical, the encoder 187 generates the select signal for selecting the data of the data buffer 141. Thus the selector 188 transfers the selected data to the register write-back section 150 or data processing section 130.

As described above, besides the advantages of the foregoing embodiment 3, the present embodiment 6 has an advantage of being able to correct the data at a plurality of locations. The data correcting circuit 1800 can be installed at the position of the data correcting circuit 180 as shown in FIG. 8. In this case, the advantages of the embodiment 4 can also be achieved.

Embodiment 7

The foregoing embodiments 1–6, particularly embodiments 5 and 6 which correct a plurality of locations, must have a large scale circuit as the memory cells for storing the correction addresses and correction instructions or correction data. For example, consider the case where the ordinary instruction length of the CPU, the address size to be handled and the data width of the memory bus are each 32 bits. In this case, the embodiment 5 requires $(32+32+1) \times n$-bit memory cells as the n blocks 170$_1$–170$_n$ of the instruction correcting circuit 1700 including one bit for each correction enabling bit 1721. Likewise, the embodiment 6 requires the same number of memory cells.

The present embodiment 7 relates to a method of reducing the number of bits of the memory cells required.

Figure 11A:
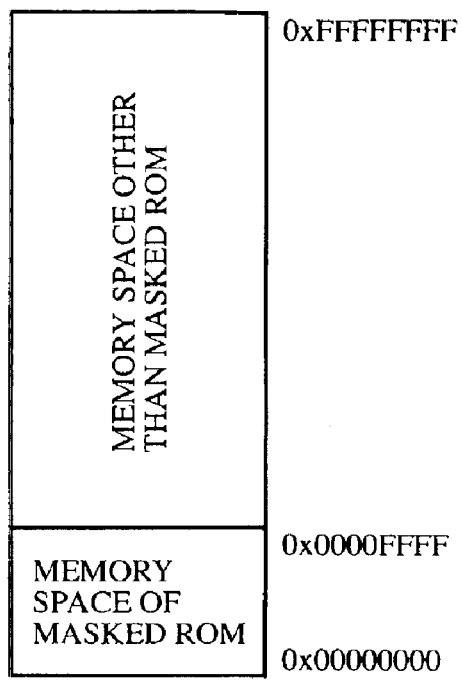
FIGS. 11A and 11B are diagrams illustrating a reduction method of memory cells at a correction address of an embodiment 7 of the electronic apparatus in accordance with the present invention.
Figure 11B:
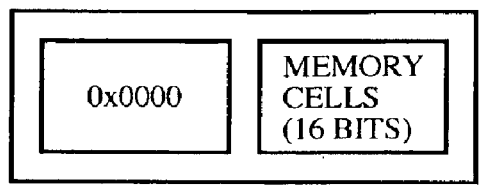

FIGS. 11A and 11B are diagrams illustrating a reduction method of the memory cells of the correction address section of the embodiment 7 of the electronic apparatus in accordance with the present invention, wherein FIG. 11A illustrates an address mapping, and FIG. 11B illustrates blocks of the correction address.

Since the target of correction is the masked ROM, it is enough that the correction address can specify the address space assigned to the masked ROM. For example, assume that the size of the masked ROM is 64 kilobytes, and is mapped on the address space from 0x00000000 to 0x0000FFFF in the address space of the CPU core (4 GB space defined by 32 bits). In this case, the higher-order 16 bits of the address can always be fixed at zero. Accordingly, the memory cells can be reduced as illustrated in FIG. 11B by fixing the higher-order 16 bits at zero.

Figure 12A:
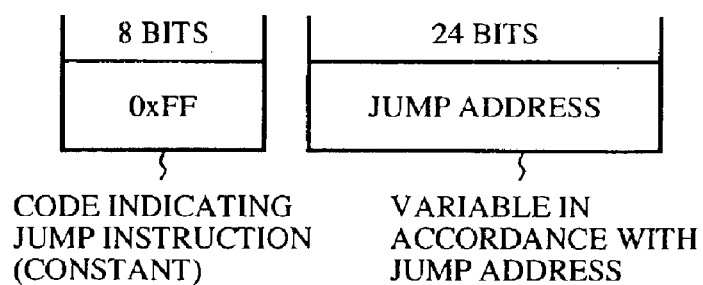
FIGS. 12A and 12B are diagrams illustrating another reduction method of memory cells of correction instructions of the embodiment 7.
Figure 12B:
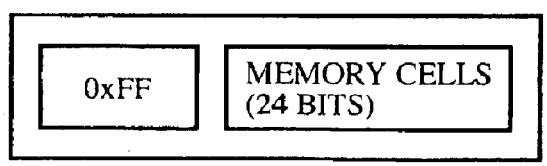

FIGS. 12A and 12B are diagrams illustrating a reduction method of the memory cells of the correction instruction of the embodiment 7 of the electronic apparatus in accordance with the present invention, wherein FIG. 12A illustrates a bit arrangement of a jump instruction, and FIG. 12B illustrates blocks of the correction instruction.

FIGS. 12A and 12B illustrate an example of reducing the number of memory cells needed for the correction instruction. As for the update of the software in the masked ROM, it is unlikely that it can be updated by substituting only one instruction. Thus, the revision is usually made by placing additional instructions in the SRAM 300, and the jump instruction to the SRAM 300 is used as the correction instruction. In addition, when substituting only one instruction, it is possible to jump to the SRAM 300 once to execute the correction instruction. Accordingly, the object of the software revision can be achieved by limiting the correction instruction to the jump instruction.

FIG. 12A shows an example of the bit arrangement of the jump instruction. The code section indicating the jump instruction is constant regardless of the jump address. Consequently, the number of bits of the memory cells in the correction instruction can be reduced by fixing the constant section of the jump instruction.

Embodiment 8

Figure 13:
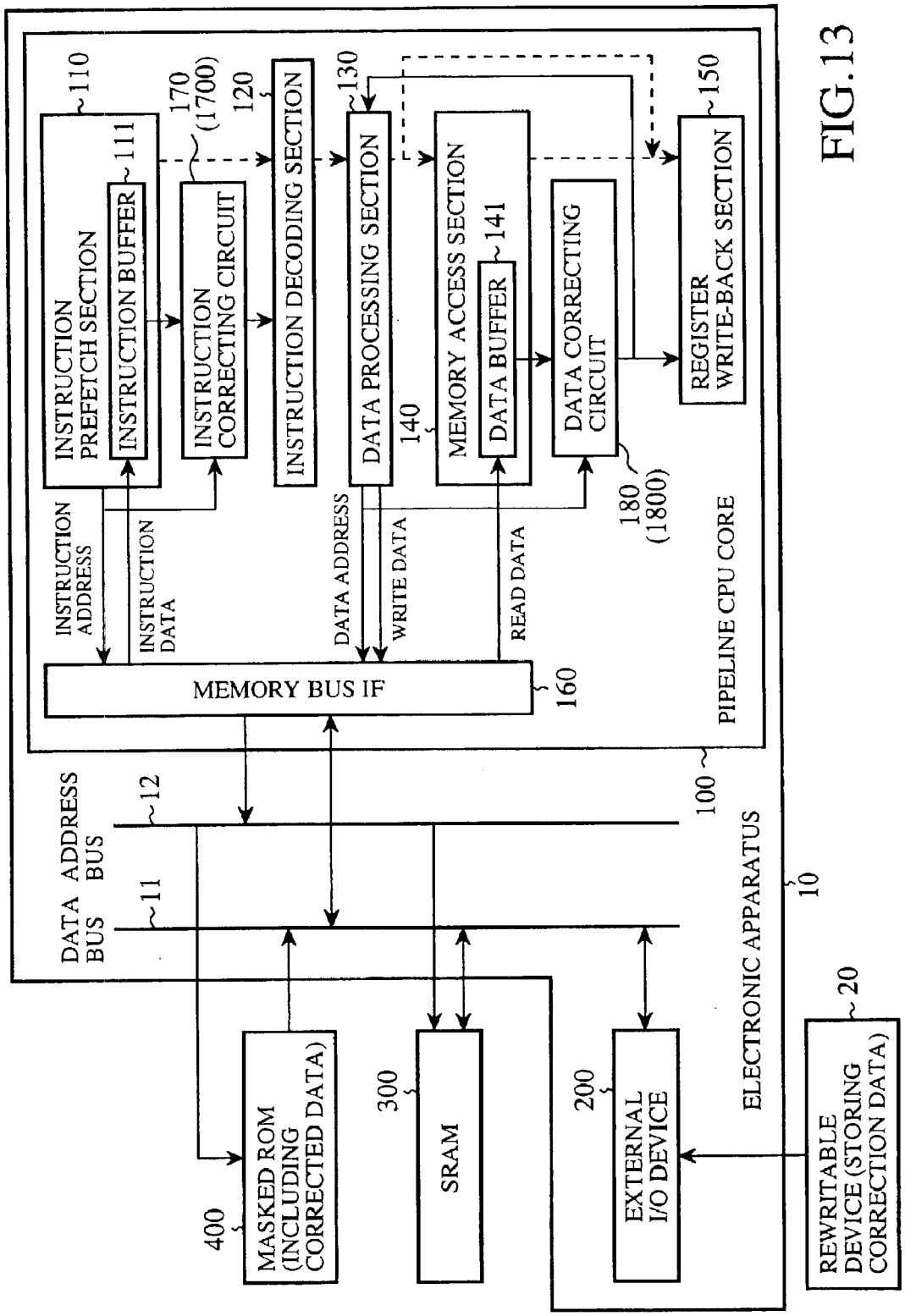
FIG. 13 is a block diagram showing a configuration of an embodiment 8 of the electronic apparatus in accordance with the present invention.

FIG. 13 is a block diagram showing a configuration of an embodiment 8 of the electronic apparatus in accordance with the present invention. In the present embodiment 8, the masked ROM 400 and SRAM 300 are placed outside the LSI constituting the electronic apparatus 10. The methods described in the foregoing embodiments 1–7 are applicable to the case where the LSI does not include the masked ROM 400 or SRAM 300.

What is claimed is:

1. An electronic apparatus including a CPU core for carrying out pipeline processing according to data read via a data bus from a read-only memory that stores specified fixed data, said electronic apparatus including an instruction correcting circuit in said CPU core, said instruction correcting circuit comprising:

a set of memory cells for storing, when initializing said electronic apparatus, a correction address, a correction instruction and a correction enabling bit, which are associated with contents of said read-only memory;

a comparator for comparing an instruction address output from an instruction prefetch stage of said CPU core with the correction address stored in said memory cells; and a selector for selecting one of an instruction code read from the instruction address of said read-only memory and the correction instruction stored in said memory cells in response to a compared result of said comparator wherein said instruction correcting circuit is placed between the instruction prefetch stage and an instruction decoding stage in said CPU core.

2. The electronic apparatus according to claim 1, wherein said instruction correcting circuit is placed between a memory bus interface and the instruction prefetch stage in said CPU core.

3. The electronic apparatus according to claim 1, wherein said instruction correcting circuit comprises n sets of memory cells, n comparators, and an encoder for generating a select signal in response to outputs of said n comparators, where n is an integer greater than one, and wherein said selector selects one of the instruction code read from the instruction address of said read-only memory and the correction instructions stored in said n set of memory cells in response to the select signal.

4. An electronic apparatus including a CPU core for carrying out pipeline processing according to data read via a data bus from a read-only memory that stores specified fixed data, said electronic apparatus including a data correcting circuit in said CPU core, said data correcting circuit comprising:

a set of memory cells for storing, when initializing said electronic apparatus, a correction address, correction data and a correction enabling bit, which are associated with contents of said read-only memory;

a comparator for comparing a data address output from a data processing stage of said CPU core with the correction address stored in said memory cells; and a selector for selecting one of data read from the data address of said read-only memory with the correction data stored in said memory cells in response to a compared result of said comparator, wherein said data correcting circuit is placed between a memory access stage and a register write-back stage in said CPU core.

5. The electronic apparatus according to claim 4, wherein said data correcting circuit is placed between a memory bus interface and a memory access stage.

6. The electronic apparatus according to claim 4, wherein said data correcting circuit comprises n sets of memory cells, n comparators, and an encoder for generating a select signal in response to outputs of said n comparators, where n is an integer greater than one, and wherein said selector selects one of the data read from the data address of said read-only memory and the correction data stored in said n set of memory cells in response to the select signal.

* * * * *